United States Patent
Fischer

(10) Patent No.: US 8,220,599 B2
(45) Date of Patent: Jul. 17, 2012

(54) BRAKE EQUIPMENT, ELEVATOR INSTALLATION, A METHOD FOR DETECTING A FUNCTION OF THE BRAKE EQUIPMENT, AND A MODERNIZATION SET

(75) Inventor: Daniel Fischer, Villarsel-sur-Marly (CH)

(73) Assignee: Inventio AG, Hergiswil NW (CH)

( * ) Notice: Subject to any disclaimer, the term of this patent is extended or adjusted under 35 U.S.C. 154(b) by 1278 days.

(21) Appl. No.: 11/941,211

(22) Filed: Nov. 16, 2007

(65) Prior Publication Data

US 2008/0116015 A1 May 22, 2008

(30) Foreign Application Priority Data

Nov. 16, 2006 (EP) .................................... 06124193

(51) Int. Cl.
*F16D 65/00* (2006.01)
(52) U.S. Cl. .................... 188/156; 188/72.7; 188/79.51; 188/106 P; 188/158; 188/161; 188/171; 188/173; 310/77; 310/103
(58) Field of Classification Search .................. 188/156, 188/393, 171, 161–163, 1.11 R, 1.11 W, 188/1.11 L, 1.11 E, 157, 158, 72.7, 196 R; 187/350; 192/70.251, 110 R, 111.1, 111.11
See application file for complete search history.

(56) References Cited

U.S. PATENT DOCUMENTS

| | | | | |
|---|---|---|---|---|
| 5,057,728 A * | 10/1991 | Dammeyer et al. | ............. | 310/77 |
| 5,253,738 A | 10/1993 | Vertesy et al. | | |
| 5,699,883 A * | 12/1997 | Albrecht | ....................... | 188/171 |
| 6,092,630 A | 7/2000 | Wendel et al. | | |
| 6,211,590 B1 * | 4/2001 | Albrecht et al. | ................. | 310/77 |
| 6,543,587 B1 * | 4/2003 | Albrecht | ....................... | 188/171 |
| 2002/0100646 A1 * | 8/2002 | Maurice et al. | ............... | 188/161 |
| 2004/0108175 A1 * | 6/2004 | Schautt | ......................... | 188/72.7 |
| 2004/0262101 A1 * | 12/2004 | Baumann et al. | .......... | 188/79.51 |
| 2007/0007083 A1 | 1/2007 | Husmann | | |

FOREIGN PATENT DOCUMENTS

| | | |
|---|---|---|
| DE | 197 37 485 C1 | 6/1999 |
| EP | 1431230 A1 | 6/2004 |
| EP | 1 655 506 A | 5/2006 |
| EP | 1 655 506 A2 | 5/2006 |
| ES | 2069121 T3 | 5/1995 |
| GB | 1 377 917 A | 12/1974 |
| GB | 1 488 374 A | 10/1977 |
| GB | 2 231 112 A | 11/1990 |
| GB | 2 241 488 A | 9/1991 |
| SU | 1763274 A1 | 9/1992 |
| SU | 1831610 A3 | 7/1993 |

* cited by examiner

*Primary Examiner* — Robert A Siconolfi
*Assistant Examiner* — San Aung
(74) *Attorney, Agent, or Firm* — Fraser Clemens Martin & Miller LLC; William J. Clemens

(57) ABSTRACT

Brake equipment, for an elevator installation, includes: a static element; a movable element movable relative to the static element in a first degree of freedom, wherein selectably a first frictional contact is produced in a first contact surface between the static element and the movable element by a controllable normal force acting in a second degree of freedom, and a first friction force opposes movement of the movable element relative to the static element; and a relative element, wherein a second frictional contact is produced in a second contact surface between the movable element and the relative element by the normal force, and a second friction force opposes movement of the movable element relative to the relative element. The relative element is movable in the first degree of freedom relative to the static element between a normal position and a braking position and is resiliently biased into the normal position.

18 Claims, 5 Drawing Sheets

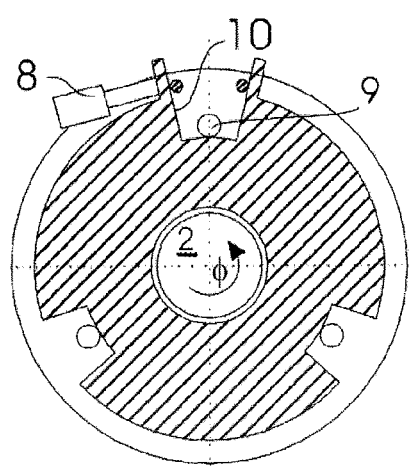
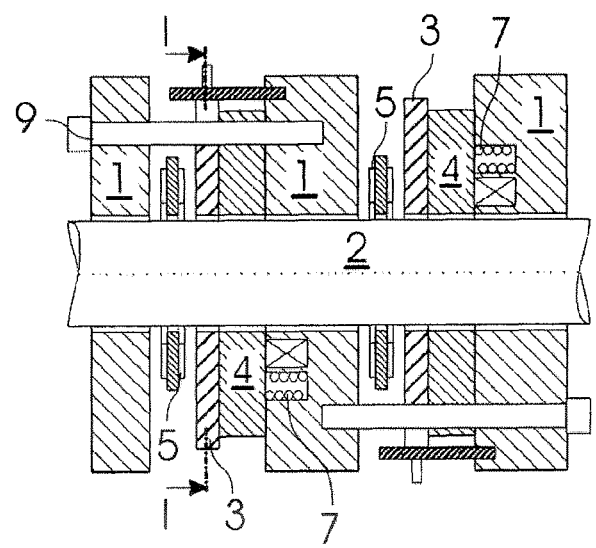
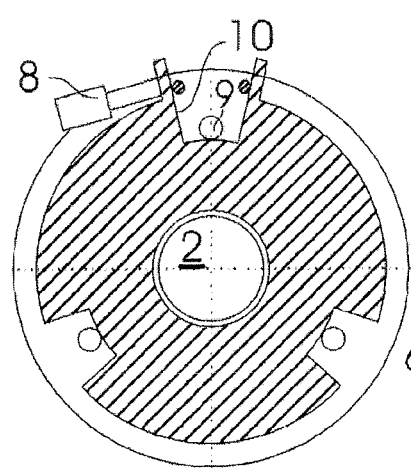
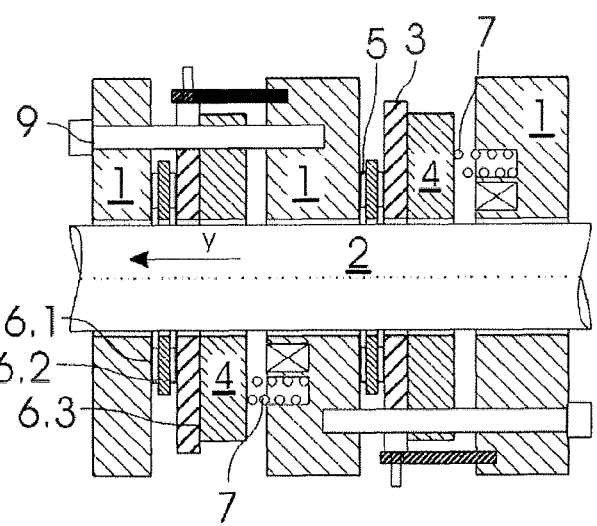

BRAKE EQUIPMENT, ELEVATOR INSTALLATION, A METHOD FOR DETECTING A FUNCTION OF THE BRAKE EQUIPMENT, AND A MODERNIZATION SET

FIELD OF THE INVENTION

This invention relates to brake equipment for holding a travel body at standstill and for retarding the travel body in the case of need, to an elevator installation with such brake equipment, to a method for detecting a function of the brake equipment and to a modernization set with such brake equipment.

BACKGROUND OF THE INVENTION

Electromagnetically actuable brake equipment with a stationary housing and a working shaft rotatable therein is known from patent document DE 197 37 485 C1. Two brake discs are connected with the working shaft to be fixed against relative rotation, but axially displaceable. Axially displaceable armature discs are biased by respective springs against the brake discs by a normal force in such a manner that a first frictional contact is produced between the brake discs and the housing and the second frictional contact between the armature discs, which are fixed against rotation relative to the housing, and the brake disc. The friction forces acting in these contacts oppose a rotation between the brake disc, which is fixed to the working shaft to be secure against relative rotation, and the housing or the armature discs, which are fixed thereto to be secure against relative rotation, and thus brake the working shaft. For release of the brake the armature discs are electromagnetically released relative to the springs. In order to reduce noise arising on actuation of the brake, the armature discs are of three-part construction.

If such brake equipment, due to, for example, wear in the brake discs, is able to exert only a reduced friction force between armature and brake discs it is possible for the armature discs to slip at the brake part discs bearing thereagainst. This places safety at risk.

SUMMARY OF THE INVENTION

It is therefore an object of the present invention to provide brake equipment which increases the safety of the brake equipment.

Brake equipment according to category generally comprises a static element and a movable element, which is movable relative to the static element in a first degree of freedom and is to be braked relative to the static element.

The term "braking" can in that case equally embrace retardation of the movable element relative to the static element, thus reduction in the relative speed thereof, as well as complete stopping or holding of the movable element. The distinction between static and movable element serves primarily for distinction between two elements movable relative to one another in a degree of freedom. In particular, for example, one of the static element and the movable element can be arranged to be inertially fixed so as to brake the other one of the static element and movable element relative to the surroundings. This element to be braked can be a drive which is used, for example, for driving, retarding or holding a drive pulley of an elevator installation and thus braking a travel body of the elevator installation. Travel bodies of the elevator installation are, in particular, a car, which serves for reception of items to be transported, or a counterweight, which is used in elevator installations for compensation for car mass and for ensuring a drive capability. The element to be braked can also be a component of the travel body or of the car or counterweight. The brake equipment can in that case be constructed as, in particular, a fixing brake for holding the car. This is the normal case with current elevator installations, since the elevator car or the drive parts, such as a drive, a counterweight and a support means, connected with the car are retarded in regulated manner to a standstill by means of electromotive force and the brake equipment consequently merely has to fix the already stationary car. Obviously, however, brake equipment of that kind has to take over, apart from the fixing function, also a braking function if, for example, in the case of a fault, such as, for example, a power interruption, a rapid stopping of the elevator car has to be carried out.

The first degree of freedom can, for example, be a rotational degree of freedom. For this purpose the movable element can be rotatably mounted in the static element. In this sense the term "force" comprehends the forces or torques acting in the respective degree of freedom, so as to represent in common the present invention which is usable in items of braking equipment acting in different degrees of freedom. When mention is thus made of a "friction force", this can, in the case of degrees of freedom, equally embrace the effective friction torque.

The first degree of freedom can also be a translational degree of freedom. For this purpose the movable element can be displaceably mounted in the static element, as is known from, for example, DE 41 06 595 A1, in which a static element in the form of a measuring brake slides linearly along a movable element in the form of a brake application rail.

A first frictional contact in a first contact surface can be selectably produced between the static element and the movable element by a controllable normal force acting in a second degree of freedom. In the first frictional contact a first friction force opposes a movement of the movable element relative to the static element. For this purpose, for example, in the patent document DE 197 37 485 C1 the brake discs are urged in a first contact surface against the housing. The first friction forces arising in these frictional contacts oppose rotation of the working shaft connected with the brake discs to be secure against relative rotation. As explained in the foregoing, the term "friction force" in that case embraces the friction torque acting on the working shaft due to the rotational degree of freedom thereof.

Moreover, one or more relative elements are provided in such a manner that a second frictional contact in a second contact surface is produced between the movable element and each of the relative elements by the normal force and in the second frictional contact a second friction force opposes movement of the movable element relative to the relative element. In the patent document DE 197 37 485 C1, for example, a first part disc of each three-part armature disc presses against the associated brake disc when the normal force tightens the brake disc against the housing. The second friction forces arising in these frictional contacts oppose rotation of the working shaft, which is connected with the brake discs to be secure against relative rotation, relative to the first part discs connected with the housing to be secure against relative rotation.

In addition, an actuating element is associated with one, preferably each, relative element and is fixed in the first degree of freedom relative to the static element, wherein a third frictional contact in a third contact surface is produced between the actuating element and the relative element by the normal force and in the third frictional contact a third friction force opposes movement of the relative element relative to the actuating element. In the patent document DE 197 37 485 C1, for example, a second part disc of the three-part armature disc presses against the first part disc when the normal force tightens the brake disc against the housing. The third friction forces arising in these frictional contacts oppose rotation of the first part discs relative to the second part discs. The first, second and/or third contact surface or surfaces is or are preferably loaded by the same normal force.

In a frictional contact there generally always arises a friction force FR which is opposite and equal to the sum of the remaining forces and which can adopt at most the value $FRmax=\mu \times FN$, wherein FN denotes the normal force acting on the contact surface and $\mu$ denotes a coefficient of friction. If in that case static friction (index H) is present, a friction force $FR^H=\mu^H \times FN$ can at most thus arise. If the sum of the remaining forces which act exceed this value, then the friction force changes from static friction to sliding friction (index G) and the coefficient of friction $FR^G=\mu^G \times FN$ arises. The term "sliding friction" in that case also embraces rolling friction such as occurs, for example, during rolling of roller bearings.

According to the present invention a relative element is now movable in the first degree of freedom relative to the static element between a normal position and a braking position and resiliently biased into the normal position, wherein the second and third contact surfaces are so constructed that a maximum second friction force, particularly in the case of adhesion in the second and third frictional contact, is greater than a maximum third friction force. A movement of the relative element in the first degree of freedom beyond the braking position is prevented in, for example, shape-locking and/or force-locking manner. For this purpose preferably abutments can limit the movement of the relative element between normal position and braking position.

This functions mechanically as follows: If the movable element is held, the normal force FN acts in the second degree of freedom, all three frictional contacts are produced and static friction prevails. Since the third friction force $FR3^H$, which acts between the relative element and the actuating element, which is fixed in the first degree of freedom relative to the static element, is always less than the second friction force $FR2max^H$ which can at most act between the relative element and the movable element, this smaller third friction force $FR3^H$ limits that friction force which is transmitted by way of the actuating element and the relative element between the static element and the movable element. Together with the first friction force $FR1^H$, which can be transmitted directly, i.e. without interposition of the actuating element and relative element, to the first contact surface, there thus results the entire friction force $FR^H$, which acts on the movable element, as a sum of these two friction forces:

$$FR^H=FR1^H+FR3^H \quad (1)$$

If this friction force in operation is now no longer sufficient for holding the movable element, which can result particularly from wear or contamination, which leads to a diminishing normal force and/or a reduced coefficient of friction in the contact surfaces, slipping of the movable element relative to the static element in the first degree of freedom occurs.

In this case the movable element also moves under effective normal force FN in the first degree of freedom. Since the maximum second friction force between relative element and movable element is, in accordance with the invention, greater than the maximum third friction force between relative element and actuating element, static friction is again present in the second frictional contact, whereas the third frictional contact slides (or rolls). In that case the movable element entrains the relative element in the first degree of freedom until it passes from its normal position to the braking position and is there stopped, for example in shape-locking manner by an abutment or the like. The relative element is consequently switched automatically, i.e. without external control influence, from the normal position to the braking position and this change takes place in both travel directions, thus rearwardly and forwardly.

As soon as the relative element is stopped in the braking position and fixed in the first degree of freedom relative to the static element, the second friction force FR2 is transmitted from the static to the movable element by way of a second contact surface between relative element and movable element. The entire friction force FR acting on the movable element thus results as a sum of these two friction forces:

$$FR=FR1+FR2 \quad (1')$$

$$>FR1+FR3 \quad (1'')$$

If in the case of braking equipment according to the present invention the entire friction force FR=FR1+FR3, which is designed for holding the movable element in the normal case, is no longer sufficient for holding the movable element, then this moves in the first degree of freedom and in that case displaces, as described in the foregoing, the relative element into its braking position, where it is fixed relative to the static element and transmits the second, larger friction force FR2 to the movable element, so that the entire friction force of FR1+FR3 acting thereon increases to FR1+FR2. Advantageously, a safety margin S=(FR1+FR2)/(FR1+FR3) can thus be available for the case that the normal total friction force is no longer sufficient due to, for example, the first and/or third contact surface having wear, being contaminated with oil or the normal force being diminished. This displaced build-up of the total force required for braking has to that extent a further favorable effect, since a force pulse on the entire moved system is reduced, as the braking force is built up over two stages.

Alternatively, instead of the third contact surface and the actuating element use can also be made of, for example, a pressing spring which on the one hand can produce a pressing of the relative element in the second degree of freedom and on the other hand enables a relative displacement of the relative element in a first degree of freedom between normal position and braking position. The relative element can in this embodiment be constructed, for example, at the same time as an armature plate. In this form of embodiment the value of the friction force of the third contact surface (FR3) reduces virtually to zero. In the following embodiments the third contact surface is always used, but as regards content it is also understood by that that this third contact surface is, as described, eliminated and the associated friction force (FR3) adopts the value zero.

In braking equipment it can be difficult to detect a faulty function simply and with reliability. Such a faulty function can be present, for example, if the braking equipment does not release during travel operation or if, as described in the foregoing, it exerts only a reduced braking force. For this purpose it is, for example, known in-house to manually check the braking force and the wear at maintenance intervals, which is costly in terms of time and personnel as well as susceptible to error.

In a preferred embodiment of the present invention the braking equipment therefore comprises a sensor device for detecting the normal position and/or braking position of the relative element. Such a sensor device can be, for example, a contact which is closed when the relative element comes into the braking position and/or is opened as soon as the normal position is left. Equally, for example, optical sensors can monitor the position of the relative element or position transmitters detect the position of the relative element.

If, as described in the foregoing, the movable element now moves, even under effective normal force FN, in the first degree of freedom, the movable element entrains the movable element in the first degree of freedom until it passes from its normal position to the braking position.

This movement of the relative element is recognized by the sensor device for detecting the normal position and/or braking position. Since the relative element is biased into the normal position and remains in this in the case of a total friction force $FR^H=FR1^H+FR3^H$ sufficient for holding, thus in the case of normal, fault-free operation, it is thus possible to reliably conclude, from a displacement of the relative element from the normal position to the braking position, faulty functioning and, for example, to issue a warning to a elevator control.

An advantage of the present invention results through the use of an advantageous monitoring logic which monitors correct functioning of the brake equipment. This monitoring logic comprises the sensor device for detecting the normal position and/or braking position of the relative element, a speed and/or travel measuring device and the control signal to the brake equipment. From case to case the brake equipment can also be provided with a further sensor for ascertaining the state "contact play removed", "brake applied", "contact play present" or "brake released". A "control signal brake" signals in the following the command state which a control device gives as control signal ("closed" or "open") to the brake equipment. The "speed" corresponds with the state of the movable element or of the travel body or elevator car and indicates whether the movable element is at standstill (0) or in motion ($\neq 0$).

A diagnosis of this state can then take place according to the following diagram:

| | Control signal Brake | | Speed | | Position Relative element | | |
|---|---|---|---|---|---|---|---|
| | closed | open | 0 | $\neq 0$ | normal | brake | Determination |
| F1 | X | | X | | X | | in order |
| F2 | X | | X | | | X | brake fault/overload |
| F3 | X | | | X | | X | in order |
| F4 | | X | | X | X | | in order |
| F5 | | X | | X | | X | release fault |

This diagnostic diagram allows an almost continuous monitoring of the function of the brake equipment, in particular since at every stop (F1, F2) the target state can be detected and in the case of deviation corresponding measures can be undertaken. A risk does not exist, since on reaching the braking position an increased braking force, usually a braking force increased by approximately the factor 2, is available. A secure holding is thus guaranteed. Equally, on determining a release error (F5) the installation can be stopped and the functioning verified. On the basis of a fault history stored in the monitoring logic, a service call can be selectively undertaken.

An idle travel of the relative element can in that case be kept small. It can be selected to be merely of such a size that a reliable determination of the position of the relative element by the sensor device is made possible in simple manner and on the other hand through the displacement of the movable element or of the travel body which occurs there is no risky deviation in stopping, such as, for example, formation of a step at a elevator car. The selected idle travel is typically approximately 3 to 10 millimeters in each of two movement directions in correspondence with the first degree of freedom.

The relative element is held in its normal position by means of a bias or after a relative displacement has taken place is restored again to the normal position. This bias can be produced, for example, by means of a resilient spring, for example a simple spring rod, a mechanical torsion or helical spring or also a hydraulic spring. In addition, biasing by means of mechanical force is possible in that magnetic poles are correspondingly arranged. Particularly in the case of use of a pressing spring instead of the actuating element as explained in the foregoing, the biasing device can be combined with a magnetic release unit.

In the foregoing the bias to be overcome by the relative element in movement from the normal position to the braking position, which bias seeks to bias or restore the relative element into the normal position, was negligible. Advantageously, the second and third contact surfaces are, however, so constructed that the maximum second friction force, particularly in the case of adhesion in the second and/or third frictional contact, is also greater than the sum of the maximum third friction force and of the force KV biasing the relative element into its normal position:

$$FR2\max{}^H > FR3\max{}^H + KV \quad (2)$$

which in the case of a negligibly small force KV for $$FR2\max{}^H > FR3\max{}^H \quad (2')$$

is fulfilled particularly when the second friction force is substantially greater than the third friction force:

$$FR2\max{}^H >> FR3\max{}^H \quad (2'')$$

Since, moreover, relatively large friction forces $FR2^H$, $FR3^H$ usually arise in items of braking equipment, particularly for elevator installations, equation (2) also applies with good approximation with equation (2') or (2'').

In the foregoing the case of holding the movable element in which static friction prevails in each of the first, second and third frictional contact was explained. If the braking equipment is provided as a fixing brake for holding, only this case arises.

If, however, the braking equipment is additionally used for retarding the movable element, then the movable element also further moves, during the retardation, under the normal force in the first degree of freedom and in that case seeks, due to the afore-described principle, to entrain the relative element and draw it from its normal position to its braking position. In this case sliding friction is present in the first and at least in the second or third frictional contact.

In this case, the force KV biasing the relative element into the normal position can be so designed that during a normal retardation process it is sufficient together with the third friction force to compensate for the second friction force and thus hold the relative element in its normal position. The bias can in general be produced, for example, by means of a resilient spring, for example a mechanical torsion or helical spring or a hydraulic spring. If the movable element is ultimately retarded to a standstill and subsequently held, then in the first, second or third frictional contact the contact states change from sliding friction to static friction. The static friction forces arising in that case are in general significantly higher than the friction forces, which prevail during retardation, in sliding friction (or rolling friction).

If the total static friction force $FR^H=FR1^H+FR3^H$ is then no longer sufficient for holding the movable element, the relative element, as described in the foregoing, is ultimately displaced into its braking position and fixed there, which is detected in the preferred embodiment by the sensor device. Since the sliding friction in general is significantly less than the static friction, the relative element during a retardation, in which sliding friction occurs in at least some of the contact surfaces, can then be kept in its normal position by a small bias, whereas in the case of holding in which static friction and thus a higher second and third friction force are present, the above-described mechanism for securing a sufficient total friction force or for detecting an erroneously low total static friction force $FR^H=FR1^H+FR3^H$ comes into action.

In a preferred embodiment the second and third contact surfaces are therefore constructed in such a manner that the second friction force $FR2^G$, which occurs in the second frictional contact during sliding, is less than the sum of the force KV, which biases the relative element into its normal position, and the third friction force $FR3^G$ and/or $FR3^H$, which arises in the third frictional contact during sliding or adhesion. The relative element is thereby kept in its normal position during retardation. At the same time, in this preferred embodiment the second and third contact surface are constructed in such a manner that the maximum second friction force $FR2max^H$, which can maximally occur in the case of adhesion in the second frictional contact, is greater than the sum of the force KV, which biases the relative element into its normal position, and the third friction force $FR3max^H$, which can occur in the case of adhesion in the third frictional contact. This is, as explained in the foregoing, simple to realize, since the static friction forces are in general significantly greater than the sliding friction forces. Thus, in the present embodiment:

$$FR2^G<KV+FR3^G \quad (3)$$

$$FR2max^H>KV+FR3max^H \quad (2)$$

As a rule, however, fulfillment of the condition (2) is already sufficient for the following reason: If the braking equipment begins the retardation process, the first, second and third frictional contacts are produced. In that case, sliding friction is immediately present in the second frictional contact between the movable element, which initially moves relative to the static element, and the relative element, which is biased into its normal position stationary relative to the static element. In the third frictional contact between the relative element and the actuating element static friction is initially present as long as the relative element is not accelerated. Now, as mentioned in the foregoing, the sliding friction is in general significantly lower than the maximum static friction. Thus, the second friction force $FR2^G$ acting in the second frictional contact is in general lower than the third friction force $FR3max^H$ which can maximally arise in the third frictional contact. Thus, in the usual case (insofar as relative element and actuating element do not move relative to one another) the second friction force in the second frictional contact, in which sliding friction prevails, is constantly less during the retardation than the third friction force in the third frictional contact, in which static friction prevails. The relative element is thus held in its normal position until the movable element comes completely to standstill. Thus, at the start of the retardation $$FR2^G<FR3max^H+KV \quad (3'),$$

so that the relative element does not move relative to the actuating element, but remains in its normal position, whilst sliding friction is present in the second frictional contact.

As soon as the movable element is stationary, the second frictional contact also changes from sliding friction to static friction and there applies $$FR2max^H>KV+FR3max^H \quad (2)$$

If, now, the remaining forces acting on the movable element exceed the friction forces maximally available from the braking equipment:

$$FRmax^H=FR1max^H+FR3max^H \quad (1''')$$

the relative element is displaced from its normal position into the braking position and fixed there, wherein advantageously a faulty functioning can be recognized. As explained, fulfillment of the condition (2) or, with disregard of the force KV, the condition (2') is thus sufficient to increase the safety of the braking equipment and to detect faulty functioning in the case of braking equipment which only holds. If the movable element is also retarded by the braking equipment, beyond that the fulfillment of the condition (3) or (3') is sufficient in order to ensure that the relative element in the normal retarding process remains in its normal position, so that subsequently the afore-described safety margin is available and advantageously a faulty function in holding can be detected.

Condition (3') is usually fulfilled simultaneously with condition (2) or (2'), since the sliding friction (or rolling friction) is usually significantly lower than the static friction. According to the present invention it is thus generally only necessary for the maximum friction force FR2max, which is present in the second frictional contact and is usually defined by the maximum static friction force $FR2max^H$, to be larger than the maximum friction force FR3max, which is present in the third frictional contact and is usually determined by the maximum static friction force $FR3max^H$ (condition (2')). Thus, in general condition (3') is also fulfilled so that even in the case of retardation the relative element is held in its normal position until the holding state is reached.

Advantageously, however, this fine matching of the bias is dispensed with if the brake equipment is used primarily as a holding or fixing brake and employed only in the case of need for dynamic retardation of the travel body. A case of need is, for example, response of a speed monitoring circuit or a power failure, etc. In such a case of need it is then very desirable for the relative element to be entrained without delay to the braking position (B) and for a higher braking force to then be necessarily produced. The requirement for the bias is then be correspondingly low; it is merely designed for moving the unloaded relative element (3) back to the normal position and for loosely keeping it there with a small force.

The maximum second friction force can, for example, be predetermined to be greater than the maximum third friction force in that the second contact surface has a higher coefficient of friction than the third contact surface. The conditions (2) or (2') and (3) or (3') can thus be fulfilled. If relative element and actuating element are acted on by the same normal force FN, then there thus results a maximum second friction force $FR2=\mu2\times FN$ which is greater than the maximum third friction force $FR3=\mu3\times FN$. For this purpose, the second and third contact surfaces can, for example, consist of different materials. For this purpose the relative element can have, on the second contact surface, a coating for increasing the coefficient of friction $\mu2$ and/or the actuating element can have on the third contact surface a coating for reduction in the coefficient of friction $\mu3$. In addition, roller bearings, for example needle bearings, for representation of specific coefficients of friction can be arranged in the third contact surface.

In a preferred embodiment the coefficients of friction of the first and second contact surfaces are substantially the same, so that substantially the same friction forces arise in the first and second frictional contacts, which advantageously can uniformly distribute the loads. The term "coefficient of friction"

can in the present instance embrace not only the static coefficient of friction, but also the sliding or rolling coefficient of friction of a frictional contact, wherein in the practical application of the first and second frictional contact the construction is, in proven mode and manner, as a friction brake lining.

The maximum second friction force can, alternatively or additionally, be predetermined to be greater than the maximum third friction force in that the third contact surface is inclined relative to the normal force. Thus, a correspondingly lower normal force acts on the inclined third contact surface and thus a correspondingly lower third friction force. Advantageously the normal force, which acts in the first, second and third frictional contact, divides in the case of an inclined third contact surface into a component normal to the third contact surface, which induces the third friction force, and a component tangential to the third contact surface, which on movement in a direction in the first degree of freedom is added to the third friction force—subtracted therefrom in the case of opposite movement—to form a third, total friction force. Thus, different third total friction forces could advantageously be represented in the case of opposite movements in the first degree of freedom. Advantageously, in the case of use of the inclined third contact surface with a relative movement between relative element and actuating element a change in the normal force results, since, for example, springs employed for producing this normal force are stressed or relieved. This is advantageously employed, for example, in the case of use in elevator installations with partly balanced counterweights, since different braking effects can thus be produced depending on a possible direction of slip.

As mentioned in the foregoing, translational forces and torques acting in the respective degree of freedom are understood in the present application by the term "force". Different friction forces can therefore also be produced by different lever arms. Thus, for example, a larger second friction force (in this case a torque) can be represented in that the second frictional contact is spaced radially further from an axis of rotation of the movable element than the third frictional contact. Thus, different friction forces, in this case torques, result for the same normal force.

The relative element and the actuating element can preferably be so moved by the normal force in the second degree of freedom that the first, second and third frictional contact is produced. This enables a simple mechanical realization of the frictional contacts. In particular, a brake element can be provided which in the first degree of freedom is fixed relative to the movable element and is so moved by the normal force in the second degree of freedom that the first, second and third frictional contact is produced. Equally, the movable element can be so moved, in particular resiliently deformed, relative to the static element by the normal force in the second degree of friction that the first, second and third frictional contact is produced.

The actuating element can be biased, in particular by a resilient means, with the normal force and selectably released electromagnetically and/or hydraulically in the manner known from, for example, the patent document DE 197 37 485 C1 or the patent document DE 41 06 595 A1. In the case of failure of a voltage applied to an electromagnet, a pressure drop in a hydraulic line or a fault in the control of the braking equipment the actuating element is no longer released, so that the normal force produces the frictional contacts and thus applies the braking equipment. In the case of a defect the braking equipment thus engages independently and automatically.

Brake equipment according to the present invention is thus constructed in such a manner that the brake equipment can, when the travel body is stationary or movable element is stationary, be switched into a normal position, in which normal position the brake equipment produces a first holding force. This holding force is designed to keep the movable element at standstill. Moreover, in the case of a possible movement of the movable element, regardless of movement direction, the brake equipment automatically changes from the normal position to a braking position. In the braking position the brake equipment generates a substantially doubled or multiplied holding force or braking force. Advantageously, this automatic change from the normal position to the braking position is monitored by means of a sensor device. The advantage of this part of the invention is that a first slipping of the movable element can be recognized by means of a sensor device and that an automatic amplification of the holding force results, whereby further slipping is prevented. Advantageously, this brake equipment is used together with a drive engine which accelerates the travel body in each instance, for example electromotively or hydraulically, in regulated manner from standstill and retards it again to standstill, whereby the brake equipment in the usual case is used only for holding the travel body at standstill.

Braking equipment according to the invention can comprise a plurality of relative elements as well as actuating elements respectively associated therewith, as is known in principle from, for example, the patent document DE 197 37 485 C1. The total friction forces explained in the foregoing then result from the sums of the first and third or second friction forces.

As explained in the foregoing, one of the possible faulty functions of brake equipment can consist in that a total friction force composed of the first and the third friction force is too small in order to hold the movable element at standstill. This faulty function can be recognized if the sensor device detects that the relative element is no longer in its normal position. In that case, movement of the relative element is preferably limited by abutments. On reaching these abutments the second friction force, which is higher by comparison with the third friction force thereby comes into play and holds the movable element. This faulty function can thus be recognized without the function of holding the movable element overall being placed at risk. It is merely an indication that the safety margin S has been taken up. The safety of the brake equipment is thus increased and servicing can be initiated.

A further possible faulty function consists in that the brake equipment is, erroneously, not released, i.e. the first, second and third frictional contact remain in place in travel operation. This faulty function can result from, for example, a defect of brake control units. This faulty function can also be recognized if the sensor device detects that the relative element is not in its normal position, because, as described in the foregoing, in such a case the movable element entrains the relative element in the first degree of freedom, whereby this is displaced out of its normal position into its braking position. A travel operation can, for example, be stopped in the case of occurrence of a faulty function of that kind before the corresponding contact surfaces overheat, wear or otherwise suffer damage.

In this connection it is particularly advantageous if functional integrity of the brake equipment and a sufficient safety margin can be detected in every normal operating play of the brake equipment. This significantly increases the operating safety of the brake equipment.

As a rule brake equipment of that kind is supplied in the case of new installations, advantageously directly together with the corresponding drive unit. Equally, corresponding brake equipment can also be used in existing installations and elevator installations as a replacement of existing brake equipment. An increased safety can thereby be achieved particularly in connection with a possible modernization of a drive regulating system. A corresponding modernization set matched to known elevator installations can be provided.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1a shows brake equipment according to a first embodiment of the present invention in the released state, in a section 1-1 in FIG. 1b;

FIG. 1b shows the brake equipment according to FIG. 1a in a side view;

FIGS. 2a, 2b show the brake equipment according to FIG. 1 in a normal holding state;

DESCRIPTION OF THE PREFERRED EMBODIMENT

Figure 3A:
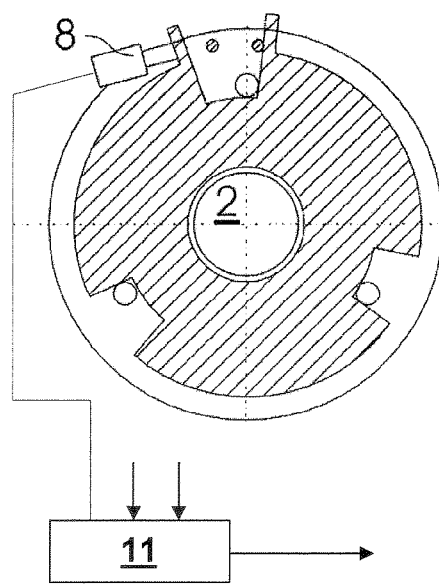
FIGS. 3a, 3b show the brake equipment according to FIG. 1 in the case of a faulty function, with monitoring logic.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1a, 1b show brake equipment according to a first embodiment of the present invention in the released, non-braking state, in a side and a front view, respectively. The brake equipment comprises a static element in the form of a multi-part housing 1, which is inertially fixed. A movable element in the form of a working shaft 2 is rotatably mounted in the housing 1 and has the rotational degree of freedom $\phi$ relative to the housing 1. Two brake elements in the form of brake discs 5 are arranged on the shaft to be axially displaceable, but secure against relative rotation, for example by means of a splined toothing or a key (not illustrated).

Two actuating elements in the form of armature discs 4 are mounted in the housing 1 to be axially displaceable, but secure against relative rotation. For this purpose three pins 9 are distributed over the circumference, which pins engage through passage bores or blind bores in the housing 1 and the armature discs 4 and on which pins the armature discs 4 slide.

A relative element in the form of a disc 3 is mounted between each brake disc 5 and associated armature disc 4 to be axially displaceable. The discs 3 each have three groove-like cut-outs 10 with a groove base, through which the pins 9 engage in such a manner that they rest on the respective groove base and thus rotatably mount the discs 2. A rotation of the discs 3 is limited in mechanically positive manner by the flanks of the grooves 10, wherein the discs can be rotated through a certain angle before the pins 9 bear against the respective flanks. The discs 3 are biased into their normal position "A", which is detected by a sensor device 8, shown in FIGS. 1, 2 by two springs which are received in the housing 1 and supported inwardly at the flanks 10 (in FIG. 1a at the top) which are prolonged for this purpose.

FIGS. 1a, 1b show the brake equipment in released state. For this purpose, electromagnets draw the armature discs 4 away from the brake discs 5, which can thereby freely rotate together with the working shaft 2, against the stress of the compression spring 7. In this state the relative elements 3 are held by the above-mentioned springs in their normal position, which indicates fault-free operation.

FIGS. 2a, 2b show the brake equipment in applied state. For this purpose, the electromagnets are no longer supplied with energy, so that the armature discs 4 are loaded by the springs 7 with a normal force FN in the direction of a second, axial degree of freedom "y". The armature discs 4 press, with the same normal force, the relative elements 3 against the brake discs 5, which are thereby axially displaced and pressed by the same normal force against the housing 1.

Under this normal force FN a first, second and third frictional contact, respectively, is produced in a first contact surface 6.1 between housing 1 and brake disc 5, in a second contact surface 6.2 between brake disc 5 and relative element 3 and in a third contact surface 6.3 between relative element 3 and armature disc 4. In that case, at the outset a sliding friction prevails in the first and second frictional contact due to the rotating working shaft 2, so that a first or second friction force (or a friction torque) $FRi^G = \mu i^G \times FN$ (i=1, 2) arises. In that case $\mu i^G$ denotes the sliding coefficient of friction in the first or second frictional contact.

In the third frictional contact static friction initially prevails, since relative element 3 and armature disc 4 are stationary relative to one another. The maximum effective third friction force FR3max is thus given by $FR3max^H = \mu 3^H \times FN$, wherein $\mu 3^H$ indicates the static coefficient of friction in the third frictional contact. This is selected so that the maximum third static friction force is greater than the second sliding friction force:

$$\mu 3^H > \mu 2^G \tag{5}$$

$$\Rightarrow \mu 3^H \times FN > \mu 2^G \times FN \tag{5'}$$

$$\Rightarrow FR3max^H > FR2^G \tag{5''}$$

The relative element 3 is held in its normal position "A" by the holding force margin ($FR3max^H - FR2^G$), whilst the brake disc 4 slides thereat. When the working shaft 2 finally stops (FIG. 2), then the first and second frictional contacts also change from sliding friction to static friction. Since the coefficients of static friction $\mu 1^H = \mu 2^H >> \mu 3^H$ are selected, the maximum second friction force FR2max is now greater than the maximum third friction force FR3max. In this connection it is to be noted that for the sake of simplicity there is discussion in each instance of only one coefficient of friction $\mu i^H$, $\mu i^G$. In reality each of these coefficients of friction is subject to scatter range or tolerance. For example, the definition $\mu 3^H > \mu 2^G$ is thus to be so understood that the value of $\mu 3^H$, regardless of its tolerance position, is greater than the value of $\mu 2^G$, regardless of the tolerance position thereof. The tolerance limits are therefore preferably selected so that the explained equations also still apply to friction forces or coefficients of friction lying at the tolerance limits, so as to ensure the functionality in accordance with the invention even in the case of scatters, which arise in practice, within the tolerances.

Figure 3B:
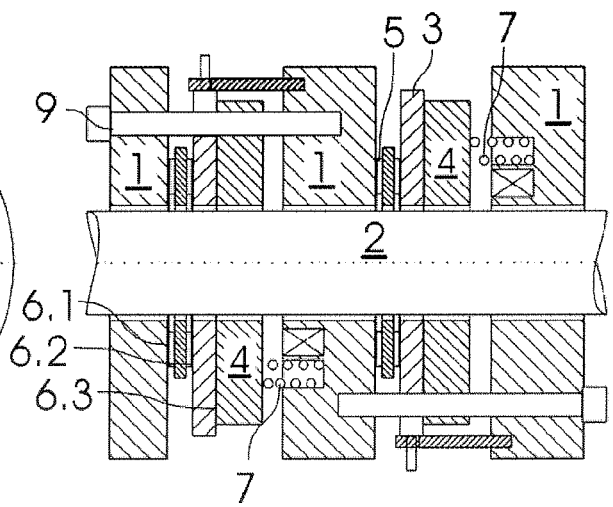

A possible faulty function of the brake equipment consists in that the brake equipment erroneously does not release when the working shaft is placed back in operation. In this case the working shaft 2 exerts by way of the brake disc 5, starting from the holding position described in the foregoing with reference to FIG. 2b, a force on the still existing, first, second and third frictional contact. Since the maximum third friction force is smallest due to the selection of the coefficients of friction $\mu1^H=\mu2^H>>\mu3^H$, initially the third frictional contact changes from static friction to sliding friction and the relative element 3 begins to rotate relative to the armature disc 4. In that case the relative element rotates into the braking position "B" shown in FIG. 3, which is detected by the sensor device 8. This thereupon issues state information to a monitoring logic 11. The monitoring logic evaluates the signal of the sensor device 8 with use of further signals, such as, for example, movement state or speed state of the travel body or of the movable element to and/or of a brake signal, which indicates whether the brake is applied or released and gives possible fault information to an elevator control (not illustrated), which stops the drive of the working shaft 2 and thus prevents annealing of the brake discs 5 and triggers a corresponding service communication.

A further possible faulty function of the brake equipment consists in that the holding force supplied by the brake equipment is not sufficient. Again, starting from the holding position described with reference to FIG. 2b the maximum braking force FRmax applied by the brake equipment in the normal position "A" is, on the basis of the embodiment with two brake discs:

$$FRmax=2\times(\mu1^H+\mu3^H)\times FN \tag{6}$$

As stated in the foregoing, due to the rotational degree of freedom φ use can in that case be made in the equations also of torques instead of translational forces. If the friction forces are now insufficient, the working shaft 2 begins to rotate. Since the maximum third friction force due to the selection of the coefficients of friction $\mu1^H=\mu2^H>>\mu3^H$ is smallest, the third frictional contact then changes from static friction to sliding friction, whereas in the second frictional contact static friction is still present. The relative element 3 begins to rotate relative to the armature disc 4. In that case the relative element again rotates into the braking position "B" shown in FIG. 3, which is detected by the sensor device 8. This thereupon issues a faulty function report, as described in the foregoing, for example by way of a monitoring logic to an elevator control (not shown).

In the braking position "B" (FIG. 3) the mechanically positive couple between pins 9 and the flanks of the cut-out 10 prevents further rotation of the relative element 3, this thereby being fixed in the first degree of freedom φ relative to the housing 1. The relative element 3 thus now transmits the larger second static friction force to the brake disc 5 and the total braking force thereby increases to $$FR=2\times(\mu1^H+\mu2^H)\times FN \tag{6'}$$

Since the brake equipment is designed so that in the normal case the friction force, which is available in the first and second frictional contact, according to equation (6) is sufficient for holding the working shaft 1 a safety margin of $(\mu1^H+\mu2^H)/(\mu1^H+\mu3^H)$ is thus given.

Figure 4:
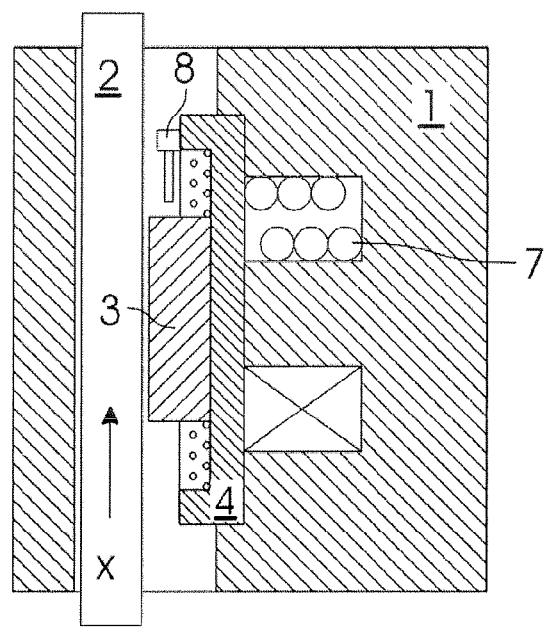
FIG. 4 shows brake equipment according to a second embodiment of the present invention in released state, in a side section.

FIG. 4 shows brake equipment according to the second embodiment of the present invention in the released state in a side section. This brake equipment is provided for an elevator installation in which the housing 1, which can be fixed to an elevator car (not illustrated), is moved in a first degree of freedom "x" along a brake disc 2.

When the brake equipment (FIG. 4) is released, an electromagnet draws an armature element 4, against the bias of the compression spring 7, in a second degree of freedom "y" into the housing 1 so that the housing 1 can slide without friction along the brake disc.

For retardation of the elevator car (FIG. 5) the electromagnet (or other suitable release drives) is switched off and the compression spring 7 presses the armature element 4 in the second degree of freedom "y" with a normal force FN against a relative element 3, which is arranged in the armature element 4 to be displaceable along the first degree of freedom "x" and is held in a normal position "A" (FIGS. 4, 5) by compression springs at both sides. The relative element 3 is thereby also pressed by the normal force FN against the brake disc 2, which in turn is pressed against the housing 1. In that case, a first, second and third frictional contact are produced, respectively, in a first contact surface 6.1 in which the brake rail 2 is pressed against the housing 1, in a second contact surface 6.2 in which the relative element 3 contacts the brake disc 2, and in a third contact surface 6.3 in which the armature element 4 and relative element 3 are in contact with one another. In that case, in the first and second frictional contact there is present, due to the brake rail 2 moving relative to the housing 1, sliding friction, and static friction in the third frictional contact between the relative and armature elements 3, 4 stationary relative to one another.

As in the first example of embodiment, the coefficients of static friction $\mu1^H=\mu2^H>>\mu3^H$ are selected. Equally, the coefficients of sliding friction $\mu1^G=\mu2^G$ in the first and second contact surface are smaller than the coefficient of static friction $\mu3^H$ in the third contact surface. Since all contact surfaces are loaded by the same normal force FN, the sliding friction force in the first and second frictional contact is lower than the maximum static friction force in the third frictional contact:

$$\mu1^G=\mu2^G<\mu3^H\mu1^H=\mu2^H \tag{7}$$

$$\Rightarrow FR1^G=FR2^G<FR3max^H \tag{7'}$$

Figure 5:
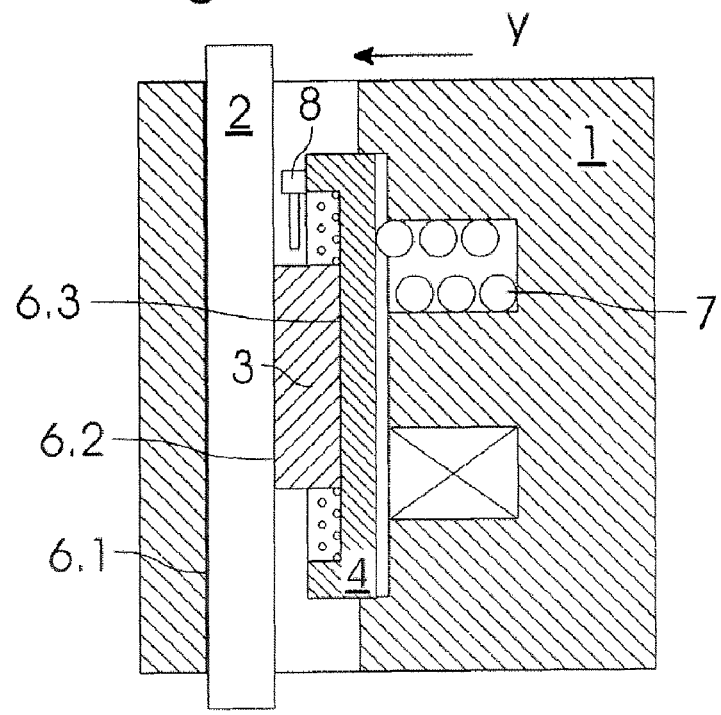
FIG. 5 shows the brake equipment according to FIG. 4 in a normal holding state.

The brake rail 2 therefore slides in the first and second frictional contact and the relative element 3 remains in its normal position "A" biased by the compression springs (FIG. 5). At standstill, the first and second frictional contact then also change from sliding friction to static friction and the total friction force, by which the brake disc 2 holds the housing 1, is limited by the static friction in the first and second frictional contact:

$$FRmax=(\mu1^H+\mu3^H)\times FN \tag{6''}$$

As in the case of the first example of embodiment, a blocking brake equipment, which notwithstanding movement of the housing 1 does not release relative to the brake disc 2, leads, just as a too-small total friction force FRmax according to equation (6"), to entraining of the relative element by the brake rail 2 in the first degree of freedom "x" until this is stopped at an upper abutment in the armature element 4 (not illustrated). In that case a sensor 8 registers the transition of the relative element from the normal position "A" (FIG. 5) to this braking position "B" (FIG. 6) and issues a faulty function report. As soon as the relative element is fixed relative to the armature element 4 by the abutment (not illustrated) in the first degree of freedom "x", the second friction force FR2 in the second contact surface 6.2 opposes the movement and the total friction force increases from FR=(μ1+μ3)×FN to FR=(μ1+μ2)×FN.

Figure 7:
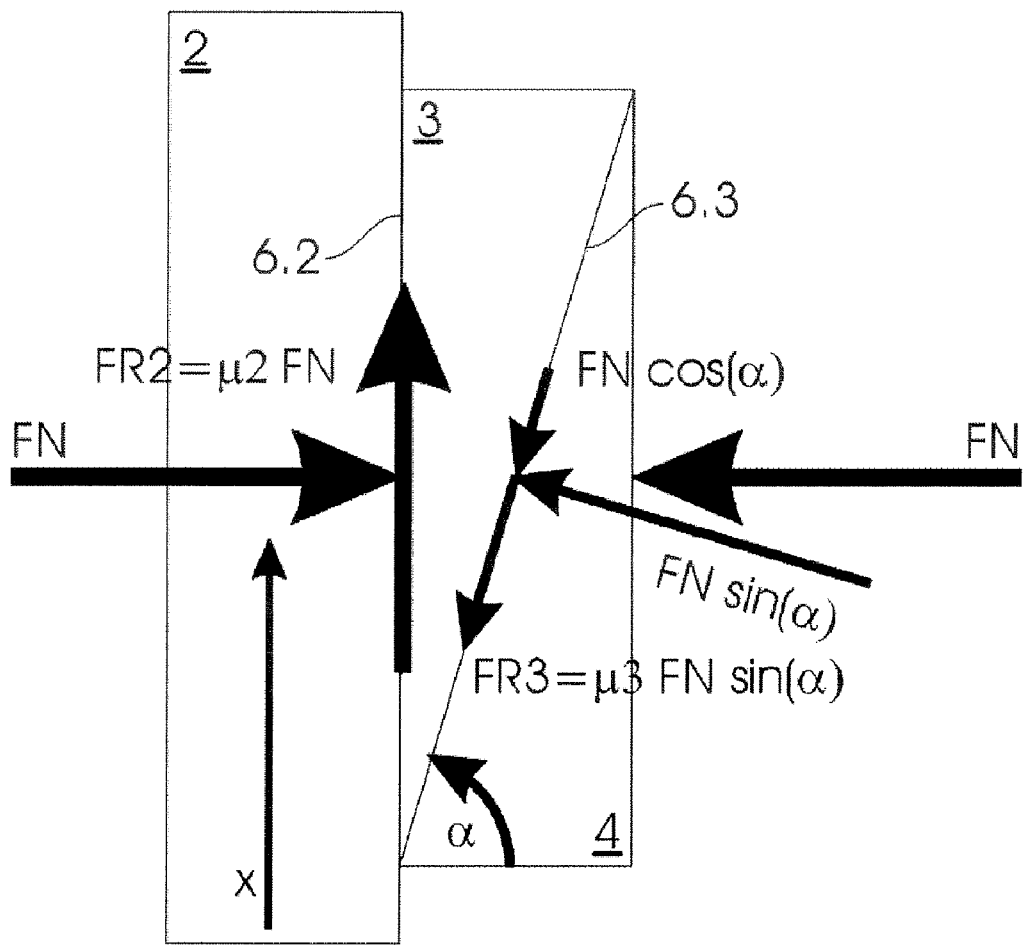
FIG. 7 shows a schematic diagram of a third embodiment of the present invention.

In the first and second example of embodiment the maximum second and third friction force was realized in each instance by appropriate selection of the coefficients of friction $\mu 2, \mu 3$, particularly the coefficients of static friction $\mu 2^H, \mu 3^H$, Alternatively or additionally, the different maximum friction forces can, however, also be realized in that the third contact surface 6.3 is inclined relative to the normal force. For this purpose, FIG. 7 shows, in a basic diagram, the forces which act on a relative element 3 when loaded by the common normal force FN. The principle shown in FIG. 7 can, for example, be realized in the first or second example of embodiment, wherein then the same reference numerals correspond with the same elements, the actuating element 4 in FIG. 7 thus corresponding, for example, with the armature disc 4 in the first example of embodiment or with the armature element 4 in the second example of embodiment.

It may be assumed at the outset that the held movable element 2 under the influence of external forces, for example the load of the elevator car, seeks to move in the first degree of freedom "x" in a positive direction (upwardly in FIG. 7). In the case of loading of the actuating element 4 with the normal force FN there then arises in the second contact surface 6.2 a friction force FR2 which is the same size as, but opposite to the sum of the remaining forces acting on the movable element 2, but can be at most FR2max=$\mu 2^H \times$FN.

The normal force FN acting in the third contact surface 6.3 inclined by the angle $(\pi-\alpha)$ relative to the normal force FN divides into two components, wherein one component FN×sin($\alpha$) is perpendicular to the third contact surface 6.3 and the other component FN×cos($\alpha$) is oriented tangentially to the third contact surface 6.3. The third friction force maximally acting in the third contact surface 6.3 thus results from the one component at FR3max=$\mu 3^H \times$sin($\alpha$)×FN. Through suitable selection of the inclination angle $\alpha$ a lower maximum third friction force can thus be predetermined, for example, for the same coefficient of static friction. If this friction force is additionally projected in the first degree of freedom "x", then a movement of the relative element 3 relative to the actuating element 4 in the first degree of freedom thus only opposes at most a static friction force of FR3max=$\mu 3^H \times$sin$^2$($\alpha$)×FN.

As can be additionally seen from FIG. 7, a movement of the relative element 3 relative to the actuating element in the first degree of freedom "x" in positive direction (upwardly in FIG. 7) additionally opposes a component FN×cos($\alpha$) which to that extent increases the total effective maximum third friction force. In the case of movement in negative direction (downwardly in FIG. 7) this component FN×cos($\alpha$), thereagainst, reduces the effective maximum third friction force, so that different maximum third friction forces result in both movement directions. This can be advantageously utilized if, for example, the elevator car, which is held by the brake equipment, is only partly balanced, i.e. the movable element 2 has to be held more strongly in one movement direction than in the other.

Figure 6:
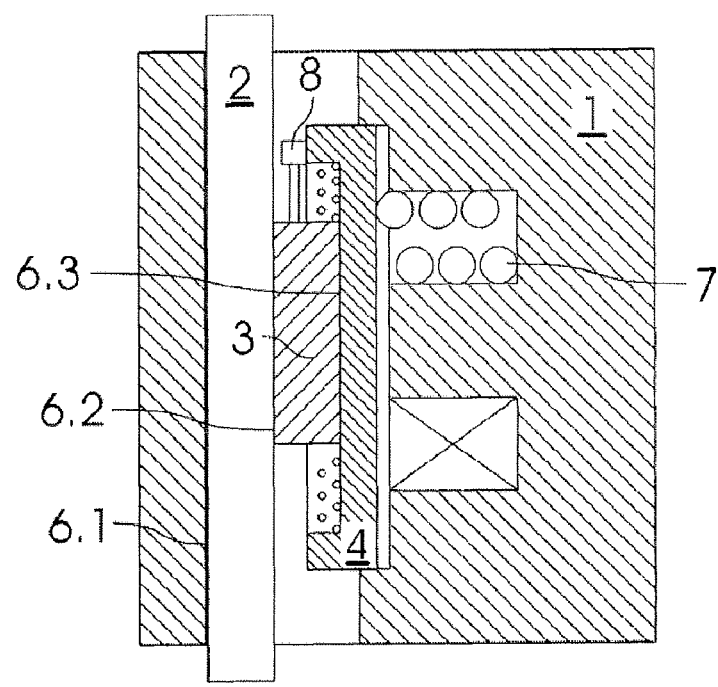
FIG. 6 shows the brake equipment according to FIG. 4 in the case of a faulty function.

Moreover, in the case of displacement of the relative element 3 relative to the actuating element 4 a change in an adjusting travel along the degree of freedom "y" necessarily results. This change causes an increase or decrease in the normal force FN in correspondence with a force characteristic of adjusting actuators, such as, for example, the compression springs 7 (FIGS. 4 to 6). A braking force can thus be influenced in correspondence with a movement direction or braking direction.

The examples of embodiment refer to a matching of the coefficients of sliding and static friction of the friction surfaces so as to be able to reliably detect a faulty function not only in the case of just holding, but also in the case of retarding and subsequent holding. This is achieved in that the condition $$\mu 2^G < \mu 3^H < \mu 2^H \quad (7)$$

is fulfilled. This is not obligatory, since in many current cases of use brake equipment in the normal case is used only for holding, for example an elevator car at standstill. Use of the brake equipment for braking is required merely in the case of fault and thus already in itself represents a fault situation. It is not necessary in these individual cases for the relative element 3 to remain in its normal position. It may indeed be displaced from its normal position to the braking position, wherein then the correspondingly higher braking force $$FR=FR1+FR2 \quad (1')$$

comes into play. This can be achieved in that the coefficients of friction $\mu 3^H, \mu 3^G$ of the third contact surface are selected to be significantly smaller than the coefficients of friction $\mu 2^H, \mu 2^G$ of the second contact surface.

$$\mu 3^G < \mu 3^H << \mu 2^G < \mu 2^H \quad (7')$$

Combinations of the depicted forms of embodiment are obviously possible. Thus, for example, several second and third contact surfaces can be combined to form a first contact surface, whereby the safety margin is additionally enhanced.

Figure 8A:
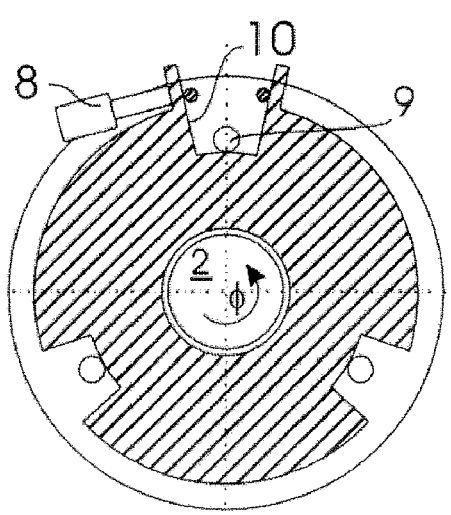
FIGS. 8a, 8b show the brake equipment according to FIG. 1, with brake discs in series.
Figure 8B:
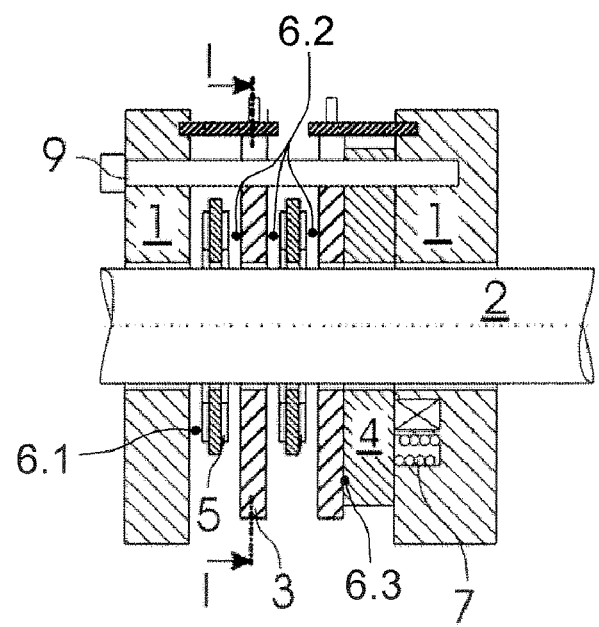

In a preferred variant of embodiment the brake equipment is installed in or attached to a drive of the elevator installation. The drive includes one or more drive pulleys which are integrated in or mounted on a drive shaft. The drive shaft is driven by a motor and held by the brake equipment at standstill or, in the case of need, braked. From case to case a speed step-up transmission can be arranged between motor and drive shaft. The drive thus also includes the brake equipment, which as a rule is divided into two substantially identical units. Each of the units in its braking position "B", taken itself, is in a position of stopping and fixing the moved travel body. According to a first form of embodiment of the drive the two units are assembled to form single brake equipment and arranged at an end of the drive shaft. The drive shaft corresponds in this mode of construction with the movable element 2. This form of arrangement is economic, since the brake equipment can, for example, be premounted as a complete unit. According to an alternative form of embodiment of the drive the two units of the brake equipment are attached to the two ends of the drive shaft. This means that the drive pulley is arranged between the units of the brake equipment. During retardation, a braking or holding moment is thus distributed by the drive pulley to the two units. Thus, significantly better force distributions to the drive shaft result and a risk of failure of the brake equipment due to fracture of the drive shaft is reduced. In the ideal case the braking action between normal position and braking position is doubled. This is the case when the coefficient of friction $\mu 3$ in the third contact surface is approximately zero. With use of items of brake equipment with several items of brake equipment connected in series, such as, for example, illustrated in FIGS. 8a and 8b, the braking force amplification between normal position and braking position can be influenced. If, for example, several brake discs 5 and relative elements 1 or static elements 1 can be arranged in series, through the formation of the idle travel of the individual relative or static elements it is possible to achieve desired amplifications of braking. In the example according to FIGS. 8a and 8b three second contact surfaces 6.2, which first come into effect in the braking position, are arranged at a first contact surface 6.1. Disregarding the friction force of the third contact surface 6.3, there thus results a multiplication of the braking force when the braking position is reached. An expert can determine desired combinations.

A principal advantage of the invention results through the use of an advantageous monitoring logic, which monitors correct functioning of the brake equipment.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. Brake equipment for holding a travel body at standstill and for retarding the travel body in the case of need, comprising:
   a static element;
   a movable element which is movable relative to the static element in a first degree of freedom corresponding with a travel direction of the travel body, wherein a first frictional contact is produced in a first contact surface between said static element and said movable element by a normal force acting in a second degree of freedom, wherein in the first frictional contact a first friction force opposes movement of said movable element relative to said static element;
   a relative element, which is adjustable in the second degree of freedom in a direction of said movable element, wherein a second frictional contact is produced in a second contact surface between said movable element and said relative element by the normal force, wherein in the second frictional contact a second friction force opposes a movement of said movable element relative to said relative element, wherein said relative element is movable in the first degree of freedom relative to said static element between a normal position and a braking position, wherein said relative element is biased into the normal position and movement beyond the braking position is blocked; and
   an actuating element which is fixed in the first degree of freedom relative to said static element and which is adjustable in the second degree of freedom during braking in a direction of said movable element, wherein a third frictional contact is produced in a third, contact surface between said actuating element and said relative element, in an adjusted state, by the normal force, in which a third friction force opposes movement of said relative element relative to said actuating element, and wherein the second and third contact surfaces are configured to generate a maximum second friction force of the second contact surface that is greater than a maximum third friction force of the third contact surface.

2. The brake equipment according to claim 1 comprising a sensor device for detecting at least one of the normal position and the braking position of said relative element.

3. The brake equipment according to claim 1 wherein the second contact surface has a higher coefficient of friction than the third contact surface.

4. The brake equipment according to claim 1 wherein the third contact surface is inclined relative to a direction of application of the normal force.

5. The brake equipment according to claim 1 wherein at least one of said relative element and said actuating element is moved by the normal force in the second degree of freedom to produce the first, second and third frictional contact.

6. The brake equipment according to claim 5 further comprising a brake element which is fixed in the first degree of freedom relative to said movable element and is moved by the normal force in the second degree of freedom so that the first, second and third frictional contact is produced.

7. The brake equipment according to claim 5 wherein said movable element and said static element are so moved relative to one another by the normal force in the second degree of freedom that the first, second and third frictional contact is produced.

8. The brake equipment according to claim 1 wherein said actuating element is biased, particularly by a resilient means, with the normal force and is selectably released by at least one of electromagnetic and hydraulic means.

9. The brake equipment according to claim 1 including a plurality of said relative elements as well as said actuating elements respectively associated therewith, wherein the second frictional contact is produced in the second contact surface between each said relative element and said movable element by the normal force and the third frictional contact is produced in the third contact surface between each said relative element and said associated actuating element by the normal force.

10. An elevator installation having the brake equipment according to claim 1 wherein one of said static element and said movable element is inertially fixed and another is coupled with a travel body, particularly with a car of the elevator installation, for at least one of holding and retarding the elevator car.

11. The elevator installation according to claim 10 wherein the normal force is dimensioned in such a manner that an adhesion force produced in the normal position of the brake equipment is sufficient to securely hold the travel body.

12. The elevator installation according to claim 10 wherein the normal force is dimensioned in such a manner that a sliding force produced in the braking position of the brake equipment is sufficient to securely retard the travel body.

13. The elevator installation according to claim 10 wherein the sliding force produced in the braking position of the brake equipment is at least 50% larger than an adhesion force produced in the normal position of the brake equipment.

14. A method of detecting a function of brake equipment according to claim 1 wherein a function is monitored by a sensor device detecting a position of said relative element.

15. The method according to claim 14 wherein the function is monitored by monitoring logic which evaluates signals from the sensor device, a control signal of the brake equipment and a movement state of the movable element.

16. The method according to claim 15 wherein the movement state represents a speed of the movable element, and wherein a faulty function is detected as the function when the monitoring logic detects that the control signal of the brake equipment indicates "closed", the movement state of the movable element indicates "0" and the relative element is disposed in its braking position; or the control signal of the brake equipment indicates "open", the movement state of the movable element indicates "≠0" and the relative element is in its braking position.

17. The method according to claim 15 wherein the movement state represents a speed of the movable element, and wherein a normal function is detected as the function when the monitoring logic detects that the control signal of the brake equipment indicates "closed", the movement state of the movable element indicates "0" and the relative element is disposed in its normal position; or the control signal of the brake equipment indicates "closed", the movement state of the movable element indicates "≠0" and the relative element is disposed in its braking position; or the control signal of the brake equipment indicates "open", the movement state of the movable element indicates "≠0" and the relative element is disposed in its normal position.

18. A modernization set with brake equipment according to claim 1 for use in an existing elevator installation wherein said brake equipment is configured to replace existing brake equipment integrated in or mounted on a drive shaft of an elevator drive of the existing elevator installation.

* * * * *